United States Patent
Augenstein et al.

(10) Patent No.: US 8,572,040 B2
(45) Date of Patent: Oct. 29, 2013

(54) METHODS AND INFRASTRUCTURE FOR PERFORMING REPETITIVE DATA PROTECTION AND A CORRESPONDING RESTORE OF DATA

(75) Inventors: Oliver Augenstein, Horgen (CH); Thomas Prause, Rottenburg (DE)

(73) Assignee: International Business Machines Corporation, Armonk, NY (US)

( * ) Notice: Subject to any disclaimer, the term of this patent is extended or adjusted under 35 U.S.C. 154(b) by 1218 days.

(21) Appl. No.: 11/741,163

(22) Filed: Apr. 27, 2007

(65) Prior Publication Data

US 2007/0260645 A1   Nov. 8, 2007

(30) Foreign Application Priority Data

Apr. 28, 2006  (EP) .................................... 06113268

(51) Int. Cl.
  *G06F 7/00* (2006.01)
(52) U.S. Cl.
  USPC ........................................................... 707/648
(58) Field of Classification Search
  USPC ..................... 707/104.1, 100, 10, 3
  See application file for complete search history.

(56) References Cited

U.S. PATENT DOCUMENTS

| | | | | |
|---|---|---|---|---|
| 5,812,130 A * | 9/1998 | Van Huben et al. | ........... | 715/764 |
| 5,826,265 A * | 10/1998 | Van Huben et al. | ................... | 1/1 |
| 5,968,121 A * | 10/1999 | Logan et al. | ................... | 709/219 |
| 6,088,693 A * | 7/2000 | Van Huben et al. | ................... | 1/1 |
| 6,119,129 A * | 9/2000 | Traversat et al. | ...................... | 1/1 |
| 6,256,634 B1 * | 7/2001 | Moshaiov et al. | ...................... | 1/1 |
| 6,347,084 B1 * | 2/2002 | Hulyalkar et al. | ............ | 370/347 |
| 6,553,384 B1 * | 4/2003 | Frey et al. | ............................. | 1/1 |
| 6,728,762 B1 * | 4/2004 | Estrada et al. | ................. | 709/218 |
| 7,054,910 B1 * | 5/2006 | Nordin et al. | .................. | 709/208 |
| 7,421,659 B2 * | 9/2008 | Estrada et al. | ................. | 715/751 |
| 7,617,289 B2 * | 11/2009 | Srinivasan et al. | ............ | 709/209 |
| 7,779,034 B2 * | 8/2010 | Pedersen et al. | ............. | 707/781 |
| 7,899,788 B2 * | 3/2011 | Chandhok et al. | ............ | 707/640 |
| 8,145,603 B2 * | 3/2012 | Yamagami | ..................... | 707/648 |
| 2001/0034733 A1 * | 10/2001 | Prompt et al. | ................. | 707/102 |
| 2003/0088656 A1 * | 5/2003 | Wahl et al. | ..................... | 709/223 |
| 2004/0133606 A1 * | 7/2004 | Miloushev et al. | ........... | 707/200 |
| 2004/0133629 A1 * | 7/2004 | Reynolds et al. | ............. | 709/202 |
| 2004/0267832 A1 * | 12/2004 | Wong et al. | ..................... | 707/200 |
| 2005/0182773 A1 * | 8/2005 | Feinsmith | ...................... | 707/100 |
| 2005/0182910 A1 * | 8/2005 | Stager et al. | ................... | 711/162 |
| 2005/0251540 A1 * | 11/2005 | Sim-Tang | ...................... | 707/202 |
| 2005/0262097 A1 * | 11/2005 | Sim-Tang et al. | ............... | 707/10 |
| 2006/0047713 A1 * | 3/2006 | Gornshtein et al. | .......... | 707/202 |
| 2007/0112866 A1 * | 5/2007 | Olson-Williams | ............ | 707/200 |
| 2008/0082592 A1 * | 4/2008 | Ahal et al. | ..................... | 707/204 |

* cited by examiner

*Primary Examiner* — Hosain Alam
*Assistant Examiner* — Eliyah S Harper
(74) *Attorney, Agent, or Firm* — Kunzler Law Group

(57) ABSTRACT

The present invention provides methods and an infrastructure for performing repetitive data protection and a corresponding restore of data for block oriented data objects comprising several indexed segments. For implementing the invention, timestamps $t_k$ are set by a timer k. Only the first data modification of a segment is recorded, after a timestamp $t_k$ has been set, by storing the old data contents of said segment together with the segment index j and said timestamp $t_k$ as undo-log block in a first journal $j_0$, before overwriting said segment with the modified new data. Besides, said undo-log blocks are transmitted to N journals $j_i$ for storing redundant undo-log information, with N>1 and i=0, . . . , N−1. According to the present invention for each journal $j_i$ journal-specific timestamps $t_{k/i}$ are generated, so that each journal $j_i$ is written for a different set of timestamps $t_{k/i}$.

21 Claims, 6 Drawing Sheets

METHODS AND INFRASTRUCTURE FOR PERFORMING REPETITIVE DATA PROTECTION AND A CORRESPONDING RESTORE OF DATA

CROSS-REFERENCES TO RELATED APPLICATIONS

This application claims priority to European Patent Office Patent Application Number EPO6113268 entitled "Methods and Infrastructure for Performing Repetitive Data Protection and a Corresponding Restore of Data" and filed on Apr. 28, 2006 for Augenstein, et al., which is incorporated herein by reference.

BACKGROUND OF THE INVENTION

1. Field of the Invention

The present invention relates to repetitive data protection for data stored in a block oriented data object comprising several indexed segments. This technology allows restoration of the data contents of block oriented data objects, as it was, before given timestamps, by using so-called undo-log information.

2. Description of the Related Art

Continuous Data Protection ("CDP") is an emerging backup and recovery technology for block oriented data objects comprising several indexed segments. As this technology has been developed for protecting large amounts of coherent data, prime candidates for applying CDP are database applications. By means of the CDP technology both backup and recovery times can be reduced to seconds, wherein the density of recovery points is high.

According to CDP, every modification of data stored in the segments of a data object is recorded by copying and writing the old data contents together with the corresponding segment index and the time of modification to an undo-log journal before writing new data to a segment. Typically, undo-log journals are not located on the same volume as the data object to be protected.

If at some point in time, corrupted data has been written to the data object, the undo-log information can be used to recover this failure. Therefore, a point in time previous to the write of corrupted data is chosen. Then, all modifications recorded in the undo-log journal from this point in time up to the current time are extracted from the undo-log journal and are written back to the corresponding segments of the data object. Via this operation any modification that has happened after the chosen point of time is in effect undone, so that afterwards the data contents of the data object is identical to its data contents at the previous time. The mechanism, how previous points in time are restored, depends on the concrete implementation of the CDP solution. Today, many CDP solutions keep their data repository on disk and avoid sequential storage media, such as tapes.

As described above, the undo-log information generated by CDP allows restoration of the data contents of a data object for any arbitrary previous point in time. Correspondingly the amount of undo-log data to be stored is high. As the amount of data that can be stored on a storage medium is limited, a reduction the number of possible recovery points has been proposed. Instead of creating a continuous undo-log journal, i.e. an undo-log journal containing every single data modification, an undo-log journal is created such that only certain points in time can be recovered, as e.g. hourly or event triggered recovery points. In the context of the present invention this approach is called repetitive data protection with coarse graining. Therefore, only the first data modification of a segment after a defined recovery point has to be recorded.

By means of CDP and repetitive data protection it is possible to optimize the time needed to restore corrupted application data by undoing data modifications instead of overwriting data with an image representing a previous point in time. If, at restore time, the amount of application data is large compared to the number of modifications that happened after corruption of data, this technology provides significantly faster recovery times as long as the point in time to be restored resides in the "near past".

Due to the fact that the size of an undo-log journal is growing over time, there is a point in time beyond which traditional restore technologies become faster than CDP or repetitive data protection. This critical point of time can be pushed further into the past by storing the undo-log journal on a random access storage medium. Then, all data modifications irrelevant for data restore to a given restore time can easily be skipped. However, this is not possible if the undo-log journal is located on a sequential storage medium.

Another problem with recovery mechanisms based on undo-log information arises from the fact that these technologies are sensitive to any data corruption that happens to the undo-log journal. A single corrupted undo-log block invalidates all points in time that could be restored using the corresponding journal. For this reason it has been proposed to write the undo-log information to multiple journals and, thus, keep redundant copies of the undo-log information.

SUMMARY OF THE INVENTION

The foregoing object is achieved by methods and an infrastructure as laid out in the independent claims. Further advantageous embodiments of the present invention are described in the subclaims and are taught in the following description.

The present invention provides a method for performing repetitive data protection for data stored in a block oriented data object comprising several indexed segments. According to this method timestamps $t_k$ are set by a timer k. These timestamps $t_k$ represent recovery points. Only the first data modification of a segment is recorded, after a timestamp $t_k$ has been set, by storing the old data contents of the segment together with the segment index j and the timestamp $t_k$ as undo-log block in a first journal $j_0$ before overwriting the segment with the modified new data. In addition, the undo-log blocks are transmitted to N journals $j_i$ for storing redundant undo-log information with N>1 and i=1, . . . , N−1. However, according to the present invention, for each journal $j_i$, journal-specific timestamps $t_{k/i}$ are generated so that each journal $j_i$ is written for a different set of timestamps $t_{k/i}$.

The starting point for the present invention, which is the critical point in time where traditional restore technologies become faster than repetitive data protection technology, can be pushed further into the past by reducing the granularity of time stamps for an undo-log journal. As only the first data modifications after a timestamp are recorded in a journal, extending the intervals between consecutive timestamps results in writing less undo-log blocks to a journal so that its size is reduced for a given period of time. This strategy has the price of not being able to restore any points in time residing in the extended intervals between consecutive timestamps because the timestamps represent the only recovery points restorable with a journal. To overcome this drawback the present invention proposes to keep redundant copies of selected undo-log blocks in a special format. According to the invention the undo-log information is stored in multiple journals with different sets of recovery points. Due to the redundant undo-log information, the reliability of repetitive data protection is increased, on the one hand. On the other hand, it is possible to reduce the amount of data needed during restore, due to the different sets of recovery points of the multiple journals. Thus, the present invention combines the advantage of having redundant journals with the advantage of a better restore performance.

In a preferred embodiment of the present invention each set of journal-specific recovery points, i.e. timestamps $t_{k/i}$, represents a different time graining. In this case, a restore to a given timestamp t can be performed by first applying the undo-log journal with the coarsest graining, drawing as near as possible back to the timestamp t. Then, the restore for the residual time interval between timestamp t and the first recovery point of the first journal after timestamp t can be accomplished step by step applying the other journals successively only for the respective residual time interval. To support this approach, the journals $j_i$ are sequenced, so that the density of timestamps $t_{k/i}$ decreases with increasing i.

As mentioned above, the method according to the invention comprises the setting of timestamps $t_k$ for the first journal $j_0$ by a timer k. In an advantageous embodiment of this method the timer k can be incremented on request. In this case, a user has the option to trigger an event to increment the timer.

Generally, it is possible to provide for each journal $j_i$ an independent timer. However, in a preferred embodiment of the present invention the journal-specific timestamps $t_{k/i}$ are generated on the base of the timestamp values $t_k$ set by the timer k for journal $j_0$. Then, regarding the restore strategy mentioned above, it is advantageous to use a set of timestamps $t_{k/i}$ for journal $j_i$, which is a subset of timestamps $t_{k/i-1}$ of journal $j_{i-1}$, wherein i=1, . . . , N−1. So, in one embodiment of the present invention, which is simple to implement, the journal-specific timestamps $t_{k/i}$ are defined as the $2^i$-th timestamps $t_k$. This approach turns out to be unsatisfactory, as long as there are no repetitive modifications to the same segments, because all journals will consist of the same amount of undo-log information, while journals with increasing i will contain less recovery points.

A better restore performance for this special case can be achieved by adaptively creating the journal-specific timestamps $t_{k/i}$. Therefore, the present invention proposes to set timestamps $t_{k/i}$ with i>0 only, if the relation of the number of segments with multiple modifications to the total number of modified segments exceeds a ratio, predefined for each journal $j_i$. Thus, redundant undo-log information is only stored if there are multiple data modifications of segments.

Regarding the restoration of data, it is advantageous to maintain an offset-table, which is updated regularly for each timestamp $t_{k/i}$. The offset-table comprises, for each timestamp $t_{k/i}$ the offset-position for writing to corresponding journal $j_i$ after the timestamp $t_{k/i}$.

One major advantage of the proposed method for repetitive data protection is that sequential storage media, as e.g. tapes, can be used for storing the undo-log journals, because not only the writing but also the reading of these journals is done sequentially. In addition, it is recommended to use different storage devices for the different journals to enhance the reliability of data protection.

In addition to a method for performing repetitive data protection for a block oriented data object, the present invention provides a method for restoring data of a block oriented data object by using undo-log information generated and stored as described above. According to the claimed method each journal $j_i$ represents a different time graining of undo-log information. Also, the density of the corresponding timestamps $t_{k/i}$ decreases with increasing i. To restore the data contents of a data object as it was before a given timestamp t, in a first step, the last journal $j_{N-1}$ is read starting from the first undo-log block comprising the first timestamp $t_{k/N-1}$ which is the same as or occurs after timestamp t, until the end of journal $j_{N-1}$. Then, reading continues with the next journal $j_i$ in decreasing order, starting from the first undo-log block, comprising the first timestamp $t_{k/i-1}$ which is the same as or occurs after timestamp t, until the first undo-log block comprising timestamp $t_{k/i}$ which is the same as or occurs after the first timestamp $t_{k/i+1}$, having been read for the preceding journal $j_{i+1}$. This step of reading is repeated for all next journals $j_{i-1}$. It has to be mentioned here that reading an undo-log block does not necessarily mean applying it to the data object to be restored. The data stored in an undo-log block read from a journal is only written to the corresponding segment of the data object if the segment has not been re-written before, initiated by an undo-log block read before from the same journal.

The application of duplicate undo-log blocks can easily be omitted by means of a restore table, generated for each currently read journal and listing the indexes of those segments which have already been re-written by applying the journal.

Therewith, a restore to a given timestamp t is performed by first applying the last undo-log journal $j_{N-1}$ with the coarsest graining, drawing as near as possible from current time back to the timestamp t. Then, the restoration for the residual time interval between timestamp t and the first recovery point of the journal $j_{N-1}$ after timestamp t can be accomplished step by step applying the other journals $j_{N-2}, j_{N-3}, j_{N-4}, \ldots j_0$ successively only for the respective residual time interval.

In an even more efficient embodiment of the present invention, the restore does not start from current time, like in the variant described above, but from the given timestamp t. Therefore, the undo-log journals $j_i$ are applied successively with increasing i. In this case, the first undo-log journal $j_0$ with the highest density of recovery points is applied first only covering the relatively short time interval between the timestamp t and the first recovery point after timestamp t of the next coarser undo-log journal. By applying all next journals $j_i$ with i=1, . . . , N−2, accordingly, the whole time interval between timestamp t and the first recovery point of the last journal $j_{N-1}$ after timestamp t is covered before the restore is accomplished by applying the last journal $j_{N-1}$ with the coarsest graining to the residual, in most cases, largest time interval up to current time. In this embodiment less undo-log blocks have to be applied to a data object for restoration than in the embodiment described above, because the application of duplicate undo-log blocks is not necessary and can easily be omitted by means of a restore table listing the indexes of those segments which have already been re-written.

Additionally, enhancements of both methods for restoring data are proposed which are able to compensate errors when reading an undo-log journal. This error handling takes advantage of the redundancy stored in the set of N journals in a very efficient way, and is described in detail in connection with FIGS. 5 and 6.

According to the claimed restoration method described above, always the first undo-log block comprising the first timestamp $t_{k/i}$ which is the same as or occurs after timestamp t in a journal $j_i$ has to be located, which is the offset-position for timestamp $t_{k/i}$ in the journal $j_i$. In an advantageous embodiment of the claimed method, the offset-position is identified by means of an offset-table comprising for each timestamp $t_{k/i}$ the offset-position for writing to the corresponding journal $j_i$ after the timestamp $t_{k/i}$.

Finally, the present invention provides an infrastructure for performing repetitive data protection and a corresponding restoration of data, which is stored in a block oriented data object comprising several indexed segments. The infrastructure comprises at least one block oriented data object, which is the subject of repetitive data protection according to the invention; a timer for setting timestamps, representing consecutive recovery points; an interceptor for holding the new data to be written to the data object until the old data to be overwritten is extracted for creating undo-log information; N journals $j_i$ for storing redundant undo-log information, with N>1 and i=0, ..., N−1; and a journaling component for generating undo-log blocks and writing them to multiple journals $j_i$. According to the invention the journaling component comprises a splitter for writing each undo-log block to multiple journals and for generating for each journal $j_i$ journal-specific timestamps $t_{k/i}$.

In preferred embodiments of the invention, the infrastructure may further comprise means for maintaining an offset-table, listing for each timestamp $t_{k/i}$ the offset-position for writing to the corresponding journal $j_i$ after the timestamp $t_{k/i}$, and means for maintaining a restore table listing the indexes j of those segments which have already been re-written with a certain journal in case of a restoration.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

The above, as well as additional objectives, features, and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

The described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
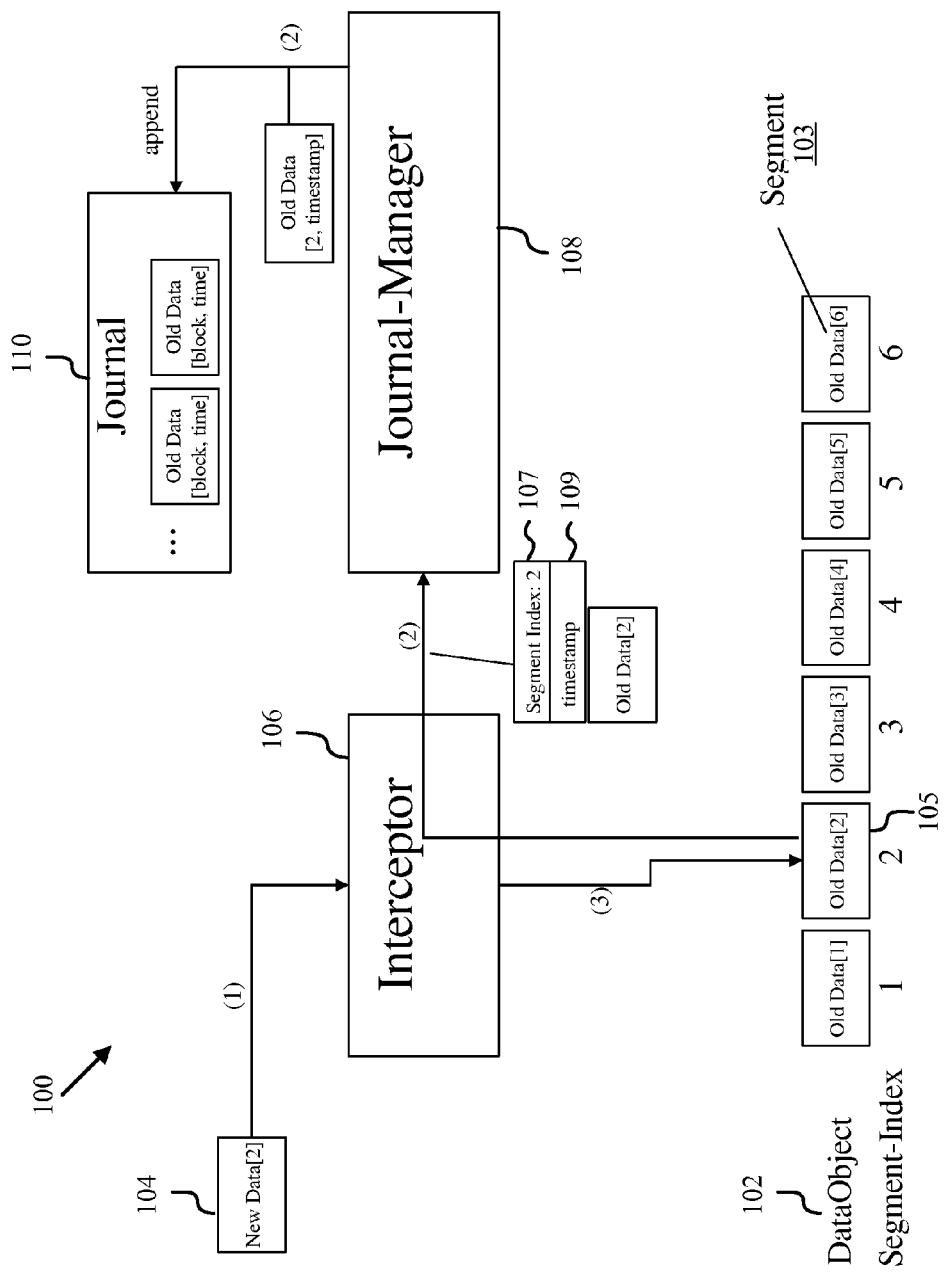
FIG. 1 shows a backup-restore system, which is the state-of-the-art and starting point for the present invention.

The infrastructure 100 shown in FIG. 1 represents the state-of-the-art for performing repetitive data protection and a corresponding restore of data, which is stored in a block oriented data object. It is discussed in the following to explain the context of the invention and to point out the differences between the state of the art and the solution proposed by the invention.

As already mentioned above, this backup-restore system comprises a block oriented Data Object 102 with several indexed Segments 103, which is the subject of the repetitive data protection. The actual contents of the indexed Segments 103 is referred to as Old Data(j). FIG. 1 illustrates the situation where New Data 104 shall be written to Segment 2. Therefore, New Data(2) 104 is first transmitted to an Interceptor 106, where it is held until the Old Data(2) 105 to be overwritten is extracted and transmitted to a Journal-Manager 108. Only then, Segment 2 is overwritten with New Data(2) 104. The Journal-Manager 108 creates an undo-log block based on Old Data(2) and the Segment-Index 2 107, which is received from the Interceptor 106, and a timestamp 109, received from a timer, which is not explicitly shown in FIG. 1. Then, the Journal-Manager 108 appends this undo-log block to a sequential Journal 110 only if the corresponding segment was not written to the journal previously with the same timestamp that is associated to the current undo-log block.

Figure 2:
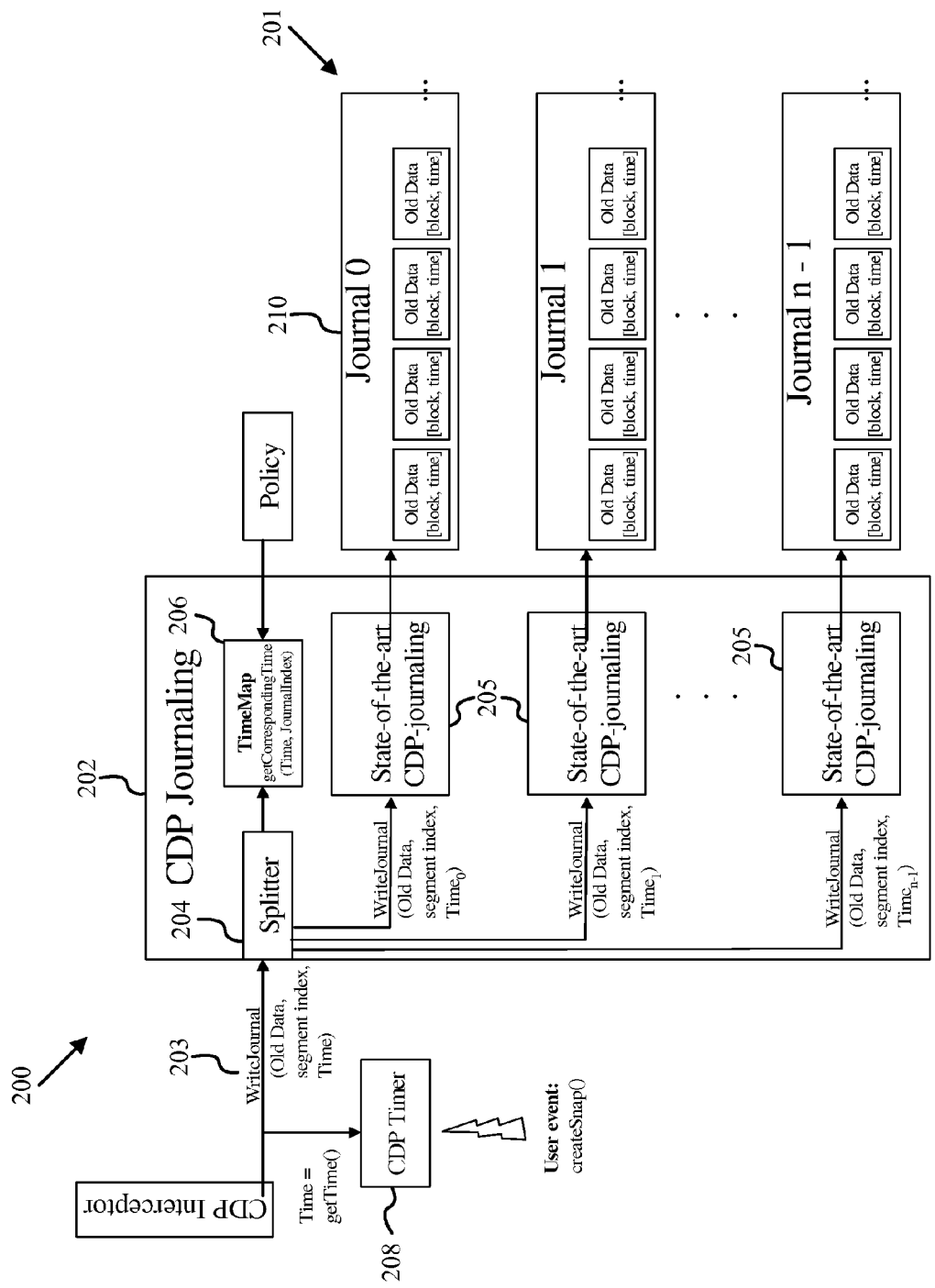
FIG. 2 shows that part of a backup-restore system, as illustrated in FIG. 1, which has been modified according to the present invention.

The main difference between the state of the art as described above and the invention concerns the undo-log Journal and the Journal-Manager 108. That is the reason why these aspects are depicted in FIG. 2. Instead of providing only one journal for storing undo-log blocks of segments which have been modified, a set of N Journals $j_i$ 201 is provided to store redundant undo-log information. In addition, the Journal-Manager 108 is replaced with a Journaling Component 202 which is capable of writing to multiple Journals 201, each of which is sequential in this embodiment of the invention.

Therefore, the Journaling Component 202 comprises a Splitter 204, that multiplies every "writeJournal" request 203 to multiple state-of-the-art Journaling components 205. In addition, the Splitter 204 generates journal-specific timestamps $t_{k/i}$, named "Time$_i$" in FIG. 2, such that "writeJournal" requests 203 to different journals $j_i$ 201 are executed with the journal-specific timestamps Time$_i$. In the example described herein, the journal-specific timestamps Time$_i$ are retrieved from a TimeMap 206 offering the function "getCorrespondingTime". This function translates a timestamp Time, as it was created by the Timer 208, into a corresponding timestamp Time$_i$ for each journal $j_i$. It should be mentioned here, that the function "getCorrespondingTime" is, preferably monotonic, growing in time for a fixed journal index "i", and preferably decreasing in "i" for a fixed value of "Time". One possibility for implementing "getCorrespondingTime" is:

Time$_i$=integer value of (2$^{-i}$•Time)

Then, each set of timestamps Time$_i$ for journal $j_i$ is a subset of the set of timestamps Time$_{i-1}$ for journal $j_{i-1}$, comprising only every other timestamp Time$_{i-1}$ of the set, wherein i= 1, . . . , N−1.

Another more sophisticated alternative for implementing "getCorrespondingTime" is to increment Time$_i$ only if the ratio of the amount of data written to journal $j_i$ with timestamp Time$_i$ over the total number of modifications including those undo-log blocks not written to journal $j_i$ during that period gets lower than a predefined ratio for journal $j_i$.

In this case, the journal-specific timestamps Time$_i$ are created adaptively but the recovery points of different journals are not necessarily aligned.

Another implementation of "getCorrespondingTime" that adaptively creates aligned recovery points is:
Increment Time$_i$ for journal $j_i$ (i>0) if a recovery point in journal $j_{i-1}$ was set and the ratio of the amount of data written to journal $j_{i-1}$ since last recovery point in journal $j_i$ over the amount of data written to journal $j_i$ since last recovery point in journal $j_i$ exceeds a predefined ratio $r_i$.

In the embodiment illustrated in FIG. 2 the Timer 208, generating the timestamps Time for Journal $j_0$ 210, is incremented only on request. Thus, a user can trigger an event to increment the Timer 208. If the Timer 208 receives this event it increments the internal timestamp Time and returns the new, higher timestamp value Time upon all succeeding calls of getTime. Consequently, only those points in time can be recovered at which an event was triggered.

It should be mentioned here that the TimeMap 206 of the Journaling Component 202 additionally maintains an offset table comprising, for each timestamp Time$_i$, the offset-position for writing to corresponding journal $j_i$ after the timestamp Time$_i$. If a journal does not host any undo-log block for a certain timestamp the corresponding offset value is NONE. Thus, the offset table allows quick location of all of those positions within the journals at which the timestamp of the undo-log blocks changes its value.

Figure 3:
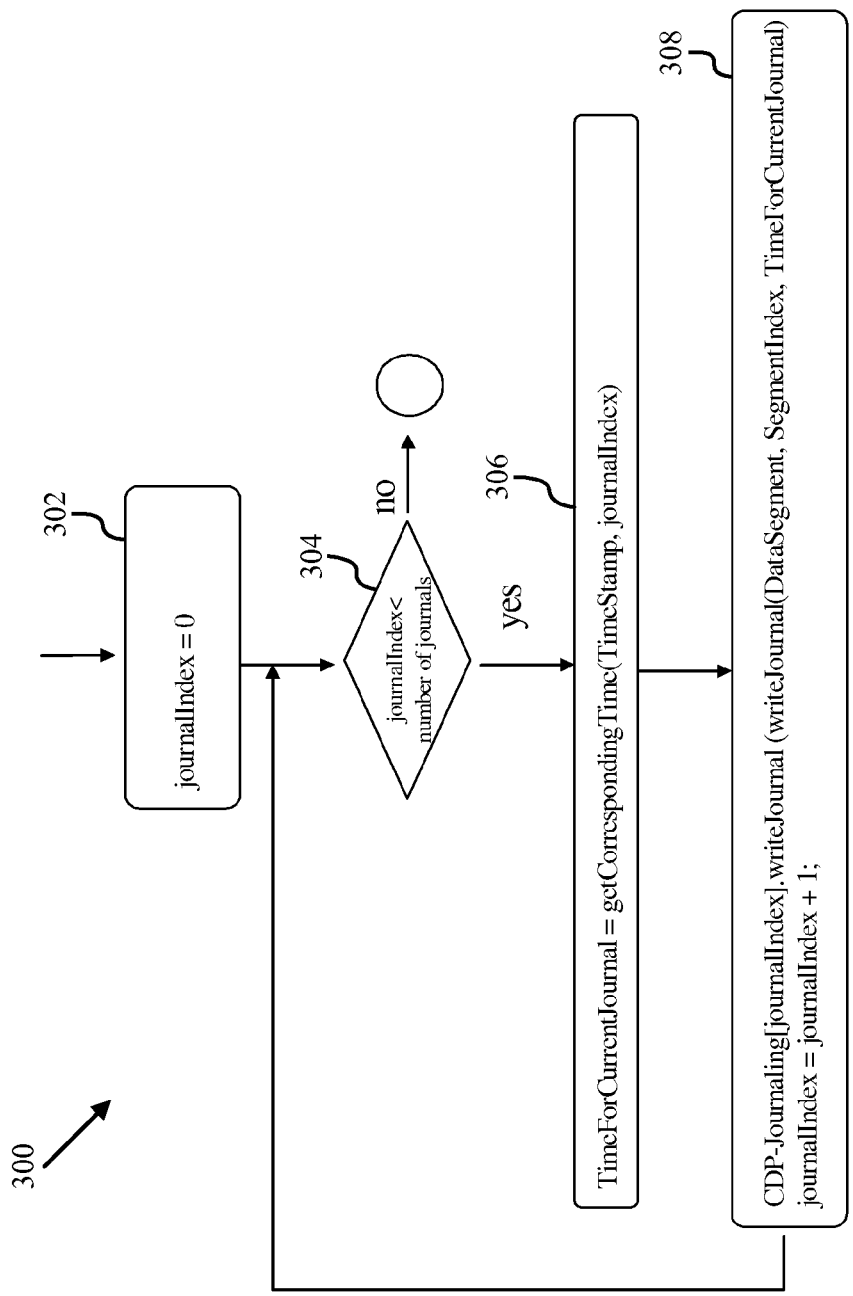
FIG. 3 shows a flowchart illustrating the writing to multiple undo-log journals according to the present invention.

The flowchart 300 of FIG. 3 illustrates how the Splitter 204 manages the writing to multiple undo-log journals according to the present invention.

When receiving a "WriteJournal" request 201, the Splitter-algorithm is initialized with journalIndex=0 302. Then in a first step 304, the algorithm checks "journalIndex<number of journals," whether there is still another journal to be written to. If so, a journal-specific timestamp is retrieved 306, as explained in detail in connection with FIG. 2, with "TimeForCurrentJournal=getCorrespondingTime(TimeStamp, journalIndex)." Then state-of-the-art journaling is executed 308 for the current journal with "Journaling(journalIndex).writeJournal(writeJournal(DataSegment, SegmentIndex, TimeForCurrentJournal))." Finally, the journalIndex is incremented 308 to repeat the same procedure for all journals $j_i$ 201. The write operation performed from the different Journaling components can be executed concurrently.

Using this algorithm the Splitter 204 is able to multiply every "writeJournal" request 201 to multiple state-of-the-art Journaling components, where each "writeJournal" request 201 is executed with a journal-specific timestamp.

As mentioned above, the diagram 400 of FIG. 4 illustrates the data structure of the undo-log journals generated according to the present invention. The time is represented on the x-coordinate 402 and the journals i are indicated on the y-coordinate 404 of this diagram. Any "x" 406 denotes one possible recovery point, that can be restored when using only journal i. Any possible recovery point can be restored with journal 0 210.

As the function "getCorrespondingTime" is monotonically decreasing with the index of the journal, the number of possible recovery points with journal i+1 is smaller than the number of possible recovery points with journal i. As a consequence, the number of duplicate undo-log blocks in journal i+1 is less than the number of duplicate undo-log blocks in journal i, because duplicate undo-log blocks can only occur between non-consecutive recovery points.

It should be mentioned here, that even though the function "getCorrespondingTime" is monotonically decreasing in the index all these times for different journals represent the same time according to the CDP Timer 208 and according to the "end-user."

Figure 4:
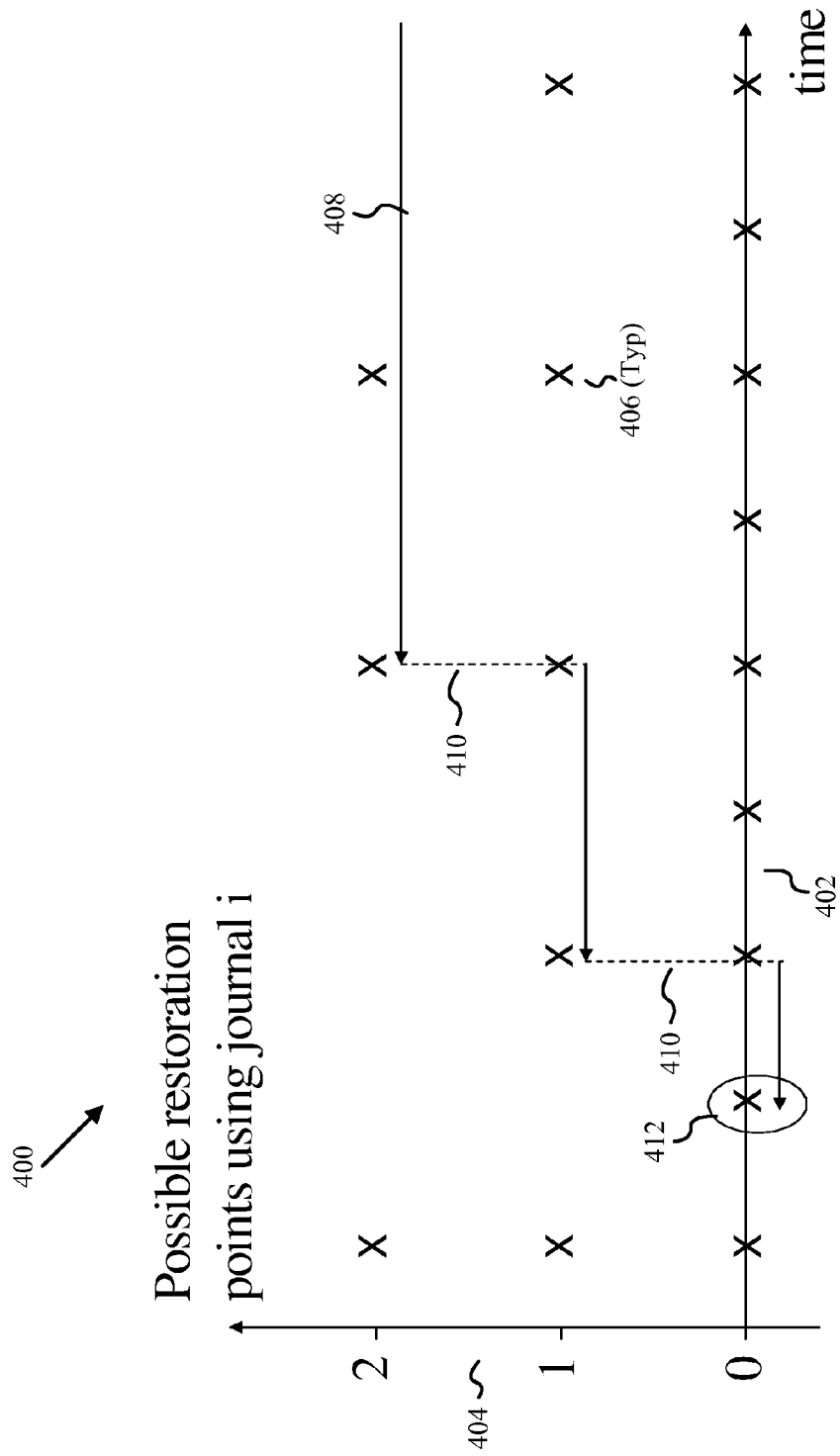
FIG. 4 shows a diagram illustrating the data structure of the undo-log journals generated according to the present invention.

The undo-log journals, illustrated in FIG. 4 can be used for restore regarding two different aspects.

As these multiple journals 201 contain redundant undo-log information, it is possible to switch to a different journal in most cases of read errors on one of the undo-log journals. Additionally, these multiple journals 201 allow reduction of the amount of data necessary to read for restoring a given point in time as e.g. the one highlighted in FIG. 4. Therefore, this point in time is approximated starting with the last journal 2 408. Thus, the first recovery point of journal 2 after the targeted point in time is restored. Then, the restore algorithm uses the other journals in decreasing order as indicated by the arrows connected by dotted lines 410. Therewith, the remaining journals are only applied to the respective residual interval between the targeted point in time and the last recovery point restored 412.

The restoration of data for a given TimeStamp on the base of multiple undo-log journals as described above is explained in more detail in connection with FIG. 5.

The restore algorithm 500 is initialized 502 by moving to the end of the last undo-log journal with
"journalIndex=number of journals−1" and
"offsetOfLastBuffer=end"
Then in a first step 504, the algorithm checks with "journalIndex<0" whether there is still another journal to read and apply to the data object to be restored. If journalIndex>=0, the algorithm locates the first undo-log block written to the corresponding journal after TimeStamp, which is the point in time to be restored, with "Find the offset of the first entry within journal(journalIndex) associated with a time later than TimeStamp. Use this value as "currentOffset" and "nextOffset"" 506

It is assumed here, that the TimeMap 206 of the Journaling Component 202 allows calculation of offset values from TimeStamp, i.e. this map 206 allows determination of a given TimeStamp the offset within all of the journals that defines the point starting from which the journal has to be read. The values "currentOffset", "nextOffset" and offsetOfLastBuffer" are in fact arrays that contain the appropriate offsets for all journals.

Then, the so located undo-log block is read with

"Read block and meta-info at "currentOffset from journal (journalIndex)" 508

Before applying an undo-log block read, it has to be checked as to whether or not the corresponding segment has already been re-written by a previous undo-log block read from the currently processed journal with "Was this block previously applied to the block-oriented data object from this journal?" 510

Only if a segment of the data object has not been re-written by processing the current journal, the data of the undo-log block read is written to the segment with "Overwrite the segment that has the same segment-index as it was specified in the meta-info of the undo-log block." 512

Then, the algorithm checks whether that point in time is reached that was restored by applying the previous journal with "currentOfffset>offssetOfLastBuffer" 514

If not, currentOffset is incremented 516 to read the next undo-log block of the current journal and to apply it, if necessary, as described before, until the condition "currentOfffset>offssetOfLastBuffer" is true.

Then, journalIndex is decremented 518 and "offsetOfLastBuffer" is defined as "nextOffset" before returning to the first step of the algorithm to process the next journal as described before. Thus, it is guaranteed that processing of the next journal terminates when reaching that point in time which has been restored by the previous journal.

Figure 5:
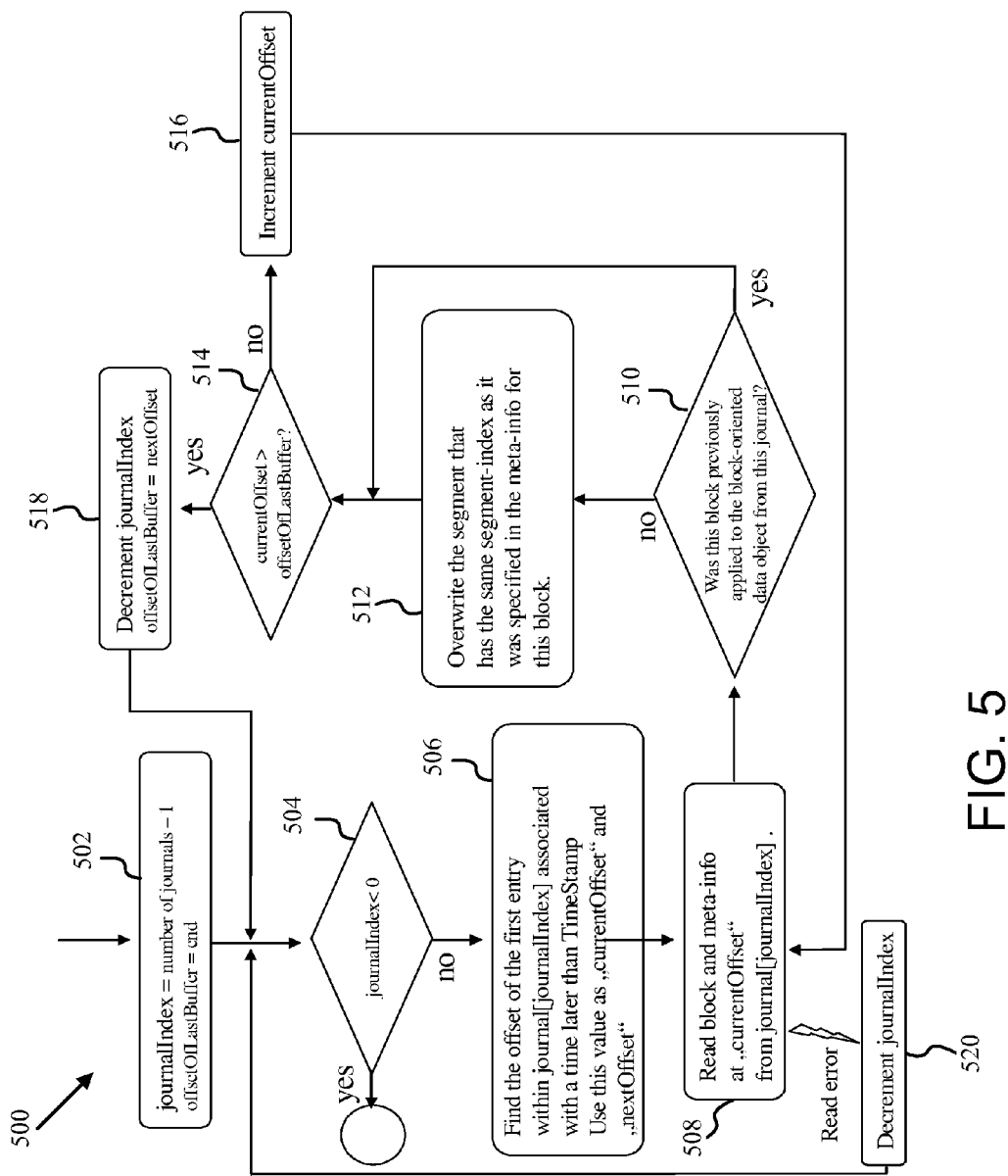
FIG. 5 shows a flowchart illustrating a first method for restoring data according to the present invention.

In addition, FIG. 5 illustrates, that journalIndex is decremented 520 also in cases of simple read errors occurring when reading an undo-log journal. Then, the algorithm returns to the first step 504, to check whether there is another Journal with the next higher density of recovery points. If so, restore continues 506 with the Journal as described before. Thus, in case of an error when reading journal $j_{N-1}$ journal $j_{N-2}$ is read 508 starting from the first undo-log block comprising the first timestamp $t_{k/N-2}$ which is the same as or occurs after timestamp t, till the end of journal $j_{N-2}$; and the preceding step of reading 508 is repeated for all next journals $j_{i-1}$.

In case of an error when reading journal $j_i$ with N−1>i>0 the next journal $j_{i-1}$ in decreasing order is read 508 starting from the first undo-log block, comprising the first timestamp $t_{k/i-1}$ which is the same as or occurs after timestamp t, till the undo-log block comprising the first timestamp $t_{k/i-1}$ which is the same as or occurs after the first timestamp $t_{k/i+1}$ having been read of the preceding journal $j_{i+1}$; and the preceding step of reading 508 is repeated for all next journals $j_{i-1}$.

The restore algorithm illustrated in FIG. 5 uses the undo-log journals 201 in decreasing order starting with undo-log journal $j_{N-1}$ with the coarsest time graining. In an alternative embodiment, the restore algorithm 600 illustrated in FIG. 6 starts with undo-log journal $j_0$ which comprises the highest density of recovery points.

When starting 602 the restore of data for a given TimeStamp according to FIG. 6 the first timestamp $t_{k/i}$ which is the same as or occurs after the given TimeStamp is determined for each undo-log journal $j_i$ with "For i=0, . . . , n−1 let journal journal[i] point to the i-th journal and let offset[i] be the offset of the first entry within journal[i] associated with a time later than TimeStamp" 604

As before, it is assumed here, that the TimeMap 206 of the Journaling Component 202 allows calculation of offset values from TimeStamp, i.e. this map allows to determine for a given TimeStamp the offset within all of the journals that defines the point starting from which the journal has to be read.

In addition, the restore algorithm is initialized by

"Set journalIndex=0, lastJournal=n−1

Define value offset[n]="end of journal n−1"" 606

Then in a first step 608, the algorithm checks with "journalIndex>lastJournal," whether there is still another journal to read and apply to the data object to be restored. If journalIndex<=lastJournal, the algorithm locates the first undo-log block written to the corresponding journal after TimeStamp, which is the point in time to be restored, with "Use the offset value offset[journalIndex] as "currentOffset" 610

Then, the so located undo-log block is read with

"Read block and meta-info at "currentOffset from journal (journalIndex)" 612

Before applying an undo-log block read, it has to be checked, whether the corresponding segment has already been re-written by an undo-log block previously read with "Was this block previously applied to the block-oriented data object?" 614

Only if a segment of the data object has not been re-written, the data of the undo-log block read is written to the segment with "Overwrite the segment that has the same segment-index as it was specified in the meta-info of the undo-log block." 616

Then, the algorithm checks whether that point in time is reached which can be restored by applying the next journal with "currentOffset>offset[journalIndex+1]?" 618

If not, currentOffset is incremented 620 to read 612 the next undo-log block of the current journal and to apply it, if necessary, as described before, until the condition "currentOffset>offset[journalIndex+1]" is true.

Then, "journalIndex" is incremented 622 before returning to the first step 608 of the algorithm to process 610 the next journal as described before. Thus, it is guaranteed that processing of a journal terminates when reaching that point in time which can be restored by the next coarser journal.

Figure 6:
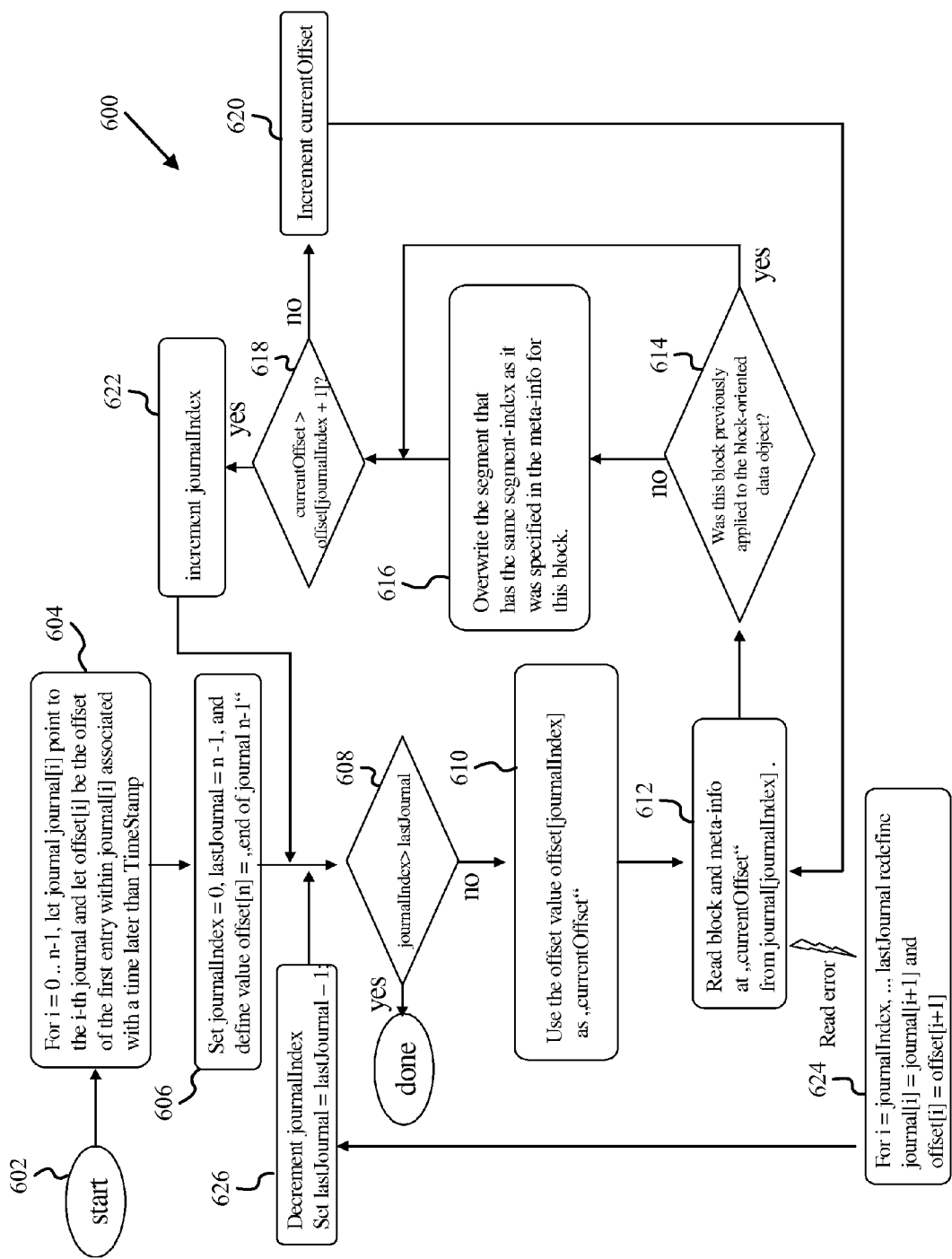
FIG. 6 shows a flowchart illustrating a second method for restoring data according to the present invention.

Furthermore, FIG. 6 illustrates how to treat simple read errors. In case of an error, when reading a certain journal [journalIndex] with journalIndex>0, the journal[journalIndex] is removed and all further journals to be read are renamed as well as the corresponding offset values with "For I=journalIndex, . . . , lastJournal redefine journal[i]=journal[i+1] and offset[i]=offset[i+1]" 624

Then, "journalIndex" is decremented and "lastJournal" is defined as "lastJournal−1" 626, before returning to the first step of the algorithm. Thus, an erroneous journal is replaced by that journal with the next higher density of recovery points.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing repetitive data protection for data stored in a block oriented data object comprising several indexed segments, the method comprising:

setting a set of timestamps $t_k$ for a first undo-log journal $j_0$ by a timer k;

recording each first data modification of a segment that occurs after a timestamp $t_k$ has been set by storing old data contents of said segment together with a segment index j and a timestamp $t_k$ as an undo-log block in the first undo-log journal $j_0$ before overwriting said segment with modified new data such that the first undo-log journal $j_0$ comprises sequential undo-log blocks corresponding to each timestamp $t_k$;

transmitting an undo-log block to one or more additional undo-log journals $j_i$ based on a timestamp $t_k$ and storing redundant undo-log information in the one or more additional undo-log journals, the redundant undo-log information comprising a subset of undo-log blocks from the first undo-log journal $j_0$, such that each additional undo-log journal comprises sequential undo-log blocks written for a different set of timestamps $t_{k/i}$, a granularity of timestamps and corresponding undo-log blocks in an additional undo-log journal decreasing such that each additional undo-log journal comprises fewer undo-log blocks than a previous undo-log journal; and restoring data contents of the segment from a state of the data contents at a start time to a state of the data contents at a target time using a sequence of undo-log blocks from two or more undo-log journals, the two or more undo-log journals selected from the first undo-log journal $j_0$ and the one or more additional undo-log journals $j_i$, each undo-log block in the sequence selected from one of the two or more undo-log journals with a coarsest available granularity for the undo-log block such that the undo-log blocks in the sequence are selected from each of the two or more undo-log journals.

2. The method of claim 1, wherein each set of timestamps $t_{k/i}$ represents a different time graining and wherein the density of timestamps $t_{k/i}$ decreases with increasing i.

3. The method of claim 1, wherein the timer k is incremented on request.

4. The method of claim 1, wherein said journal-specific timestamps $t_k$ are generated based on the timestamp values $t_k$ set by said timer k.

5. The method of claim 4, wherein said journal-specific timestamps $t_{k/i}$ are defined as the $2^i$-th timestamps $t_k$.

6. The method of claim 5, wherein said journal-specific timestamps $t_{k/i}$ is incremented only if the ratio of the amount of data written to journal $j_i$ with timestamp $t_{k/i}$ over the total number of modifications including those undo-log blocks not written to journal $j_i$ during that period gets lower than a predefined ratio for journal $j_i$.

7. The method of claim 5, wherein said journal-specific timestamps $t_{k/i}$ for journal $j_i$ (i>0) is incremented if a recovery point in journal $j_{i-1}$ was set and the ratio of the amount of data written to journal $j_{i-1}$ since last recovery point in journal $j_i$ over the amount of data written to journal $j_i$ since last recovery point in journal $j_i$ exceeds a predefined ratio.

8. The method of claim 1, characterized in that an offset-table is updated regularly for each timestamp $t_{k/i}$, wherein said offset-table comprises for each timestamp $t_{k/i}$ the offset-position for writing to corresponding journal $j_i$ after said timestamp $t_{k/i}$.

9. The method of claim 1, wherein said journals $j_i$ are stored on sequential storage media.

10. A method for restoring data of a block oriented data object comprising several indexed segments by using undo-log information generated and stored as described by:

setting a set of timestamps $t_k$ for a first undo-log journal $j_0$ by a timer k;

recording each first data modification of a segment that occurs after a timestamp $t_k$ has been set by storing old data contents of said segment together with a segment index j and a timestamp $t_k$ as an undo-log block in the first undo-log journal $j_0$ before overwriting said segment with modified new data such that the first undo-log journal $j_0$ comprises sequential undo-log blocks corresponding to each timestamp $t_k$;

transmitting an undo-log block to one or more additional undo-log journals $j_i$ based on a timestamp $t_k$ and storing redundant undo-log information in the one or more additional undo-log journals, the redundant undo-log information comprising a subset of undo-log blocks from the first undo-log journal, such that each additional undo-log journal comprises sequential undo-log blocks written for a different set of timestamps $t_{k/i}$, a granularity of timestamps and corresponding undo-log blocks in an additional undo-log journal decreasing such that each additional undo-log journal comprises fewer undo-log blocks than a previous undo-log journal, wherein each undo-log journal $j_i$ represents a different time graining of undo-log information and wherein the density of the corresponding timestamps $t_{k/i}$ decreases with increasing i; and restoring data contents of the segment to a state before a timestamp t using a sequence of undo-log blocks each selected from an undo-log journal with a coarsest available granularity for the undo-log block such that the undo-log blocks in the sequence are selected from multiple undo-log journals, the restoring comprising, reading a last undo-log journal $j_{N-1}$, the last undo-log journal $j_{N-1}$ having the fewest number of undo-log blocks relative to the first undo-log journal $j_0$ and the other additional undo-log journals $j_i$, starting from the first undo-log block comprising a first timestamp $t_{k/N-1}$ which is the same as or occurs after a time for undo-log journal $j_{N-1}$ which corresponds to timestamp t, till the end of undo-log journal $j_{N-1}$, reading the next journal $j_i$ in decreasing order starting from the first undo-log block, comprising the first timestamp $t_{k/i}$ which is the same as or occurs after the time for undo-log journal $j_i$ which corresponds to timestamp t, till the undo-log block comprising the first timestamp $t_{k/i}$ which is the same as or occurs after the first timestamp for undo-log journal $j_i$ which corresponds to the timestamp $t_{k/i+1}$ of undo-log journal $j_{i+1}$ having been read of the preceding undo-log journal $j_{i+1}$;

repeating the preceding step of reading for all next journals $j_{i-1}$ such that the data stored in an undo-log block read from an undo-log journal is only written to the corresponding segment of the data object, if said segment has not been re-written before, initiated by an undo-log block read before from the same undo-log journal.

11. The method of claim 10, wherein a restore table is generated for each currently read journal and listing the indexes j of those segments which have already been re-written with said journal.

12. The method of claim 10, wherein in case of an error when reading journal $j_{N-1}$, journal $j_{N-2}$ is read starting from the first undo-log block comprising the first timestamp $t_{k/N-2}$ which is the same as or occurs after timestamp t, until the end of journal $j_{N-2}$, and wherein the preceding step of reading is repeated for all next journals $j_{i-1}$ according to claim 10.

13. The method of claim 10, wherein in case of an error when reading journal $j_i$ with N−1>i>0, the next journal $j_{i-1}$ in decreasing order is read starting from the first undo-log block, comprising the first timestamp $t_{k/i-1}$ which is the same as or occurs after timestamp t, till the undo-log block comprising the first timestamp $t_{k/i-1}$ which is the same as or occurs after the first timestamp $t_{k/i+1}$ having been read of the preceding journal $j_{i+1}$ and wherein the preceding step of reading is repeated for all next journals $j_{i-1}$ according to claim 10.

14. The method of claim 10, wherein the offset-positions of the undo-log blocks to be read first in each journal $j_i$, are identified by means of an offset-table comprising for each timestamp $t_{k/i}$ the offset-position for writing to the corresponding journal $j_i$ after said timestamp $t_{k/i}$.

15. A method for restoring data of a block oriented data object comprising several indexed segments by using undo-log information generated and stored as described by:
   setting a set of timestamps $t_k$ for a first undo-log journal $j_0$ by a timer k;
   recording each first data modification of a segment that occurs after a timestamp $t_k$ has been set by storing old data contents of said segment together with a segment index j and a timestamp $t_k$ as an undo-log block in the first undo-log journal $j_0$ before overwriting said segment with modified new data such that the first undo-log journal $j_0$ comprises sequential undo-log blocks corresponding to each timestamp $t_k$;
   transmitting an undo-log block to one or more additional undo-log journals $j_i$ based on a timestamp $t_k$ storing redundant undo-log information in the one or more additional undo-log journals, the redundant undo-log information comprising a subset of the undo-log blocks from the first undo-log journal, such that each additional undo-log journal comprises sequential undo-log blocks written for a different set of timestamps $t_{k/i}$, a granularity of timestamps and corresponding undo-log blocks in an additional undo-log journal decreasing such that each additional undo-log journal comprises fewer undo-log blocks than a previous undo-log journal, wherein each undo-log journal $j_i$ represents a different time graining of undo-log information, wherein the density of the corresponding timestamps $t_{k/i}$ decreases with increasing i; and
   restoring data contents of the segment to a state before a timestamp t using a sequence of undo-log blocks each selected from an undo-log journal with a coarsest available granularity for the undo-log block such that the undo-log blocks in the sequence are selected from multiple undo-log journals, the restoring comprising:
      reading the first undo-log journal $j_0$, the first undo-log journal $j_0$ having the highest number of undo-log blocks relative to the additional undo-log journals $j_i$, starting from a first undo-log block, comprising a first timestamp $t_{k/i}$ which is the same as or occurs after timestamp t, till the first undo-log block comprising a timestamp $t_{k/i}$ which is the same as or occurs after a first timestamp $t_{k/i+1}$ of a next undo-log journal $j_{i+1}$, with timestamp $t_{k/i+1}$ which is the same as or occurs after timestamp t;
      repeating the preceding step of reading for all next undo-log journals $j_{i+1}$ with i=1, . . . , N−2;
      reading a last undo-log journal $j_{N-1}$ starting from the first undo-log block comprising the first timestamp $t_{k/N-1}$ which is the same as or occurs after timestamp t, till the end of undo-log journal $j_{N-1}$, such that the data stored in an undo-log block read from an undo-log journal is only written to the corresponding segment of the data object, if said segment has not been re-written before, initiated by an undo-log block read before from the same undo-log journal.

16. The method of claim 15, wherein a restore table is generated for each restore procedure listing the indexes j of those segments which have already been re-written.

17. The method of claim 15, wherein in case of an error, when reading journal $j_i$ with 0<i<=N−1,
   journal $j_i$ is removed;
   all journals $j_{i+k+1}$ are renamed to be $j_{i+k}$ with and all corresponding timestamps are renamed accordingly; and
   reading continues with journal $j_{i-1}$.

18. The method of claim 15, wherein the offset-positions of the undo-log blocks to be read first in each journal $j_i$, are identified by means of an offset-table comprising for each timestamp $t_{k/i}$ the offset-position for writing to the corresponding journal $j_i$ after said timestamp $t_{k/i}$.

19. A method for performing repetitive data protection for data stored in a block oriented data object comprising several indexed segments, the method comprising:
   setting a different granularity of timestamps for each of a plurality of undo-log journals such that the granularity of the timestamps decreases for each undo-log journal between a first undo-log journal and a last undo-log journal;
   recording, for each undo-log journal from the plurality of undo-log journals, each first data modification of a segment that occurs after a timestamp for the undo-log journal by storing old data contents of the segment, a segment index of the segment, and the timestamp as an undo-log block in the undo-log journal such that each undo-log journal from the plurality of undo-log journals comprises sequential undo-log blocks corresponding to the granularity of timestamps for the undo-log journal, each undo-log journal between the first undo-log journal and the last undo-log journal comprising fewer undo-log blocks than a previous undo-log journal based on the different granularity of timestamps for each undo-log journal; and
   restoring data contents of the segment from a state of the data contents at a start time to a state of the data contents at a target time using a sequence of undo-log blocks from two or more of the plurality of undo-log journals, the undo-log blocks in the sequence selected from one of the two or more undo-log journals with a coarsest available granularity for the undo-log block such that the undo-log blocks in the sequence are selected from each of the two or more undo-log journals.

20. The method of claim 19, wherein the target time is prior to the start time and the sequence of undo-log blocks begins with undo-log blocks from the last journal and ends with undo-log blocks from the first journal.

21. The method of claim 19, wherein the start time is prior to the target time and the sequence of undo-log blocks begins with undo-log blocks from the first journal and ends with undo-log blocks from the last journal.

* * * * *